United States Patent [19]

Salem

[11] Patent Number: 5,376,278

[45] Date of Patent: Dec. 27, 1994

[54] FILTER AND A METHOD FOR SEPARATING CHARGED PARTICLES FROM A LIQUID STREAM

[75] Inventor: Eli Salem, Deal, N.J.

[73] Assignee: The Graver Company, Union, N.J.

[21] Appl. No.: 85,953

[22] Filed: Jul. 1, 1993

[51] Int. Cl.⁵ ............................................. C02F 1/42
[52] U.S. Cl. .................................. 210/679; 210/688; 210/777; 210/193; 210/493.1
[58] Field of Search ............... 210/679, 686, 193, 777, 210/493.1, 493.5, 688

[56] References Cited

U.S. PATENT DOCUMENTS

| | | | |
|---|---|---|---|
| 3,007,579 | 11/1961 | Pall | 210/493.1 |
| 3,327,859 | 6/1967 | Pall | 210/266 |
| 4,313,832 | 2/1982 | Shimizu et al. | 210/663 |
| 4,780,213 | 10/1988 | Ogletree | 210/679 |
| 4,786,527 | 11/1988 | Fejes et al. | 210/682 |
| 4,880,595 | 11/1989 | Matsuda et al. | 210/682 |
| 4,894,154 | 1/1990 | Roz et al. | 210/266 |
| 5,192,446 | 3/1993 | Salem et al. | 210/685 |

Primary Examiner—Cynthia L. Nessler
Attorney, Agent, or Firm—Dressler, Goldsmith, Shore & Milnamow, Ltd.

[57] ABSTRACT

The invention provides a method for separating metallic corrosion products from a water stream. A filter conditioned with a relatively small amount of ion exchange material exhibits comparatively low pressure differential while processing a water stream at commercially desirable flow rates and retention efficiencies. The method permits longer filter runs with a minimal application of material on the filtration surface. The invention additionally provides a filter for separating metallic corrosion products having a relatively broad range of particle sizes from a water stream.

21 Claims, 2 Drawing Sheets

FILTER AND A METHOD FOR SEPARATING CHARGED PARTICLES FROM A LIQUID STREAM

TECHNICAL FIELD

The invention relates to separating charged particles from a liquid, by filtration and adsorption. The invention also relates to an improved filter.

BACKGROUND OF THE INVENTION

In surface filtration, solids form a filter cake which is predominantly on the surface of a porous filter medium. Surface filtration is distinguishable from depth filtration, in which a significant portion of solids are trapped relatively deep within a filter medium. In surface and in depth filtration, the filter medium is often in the form of a cartridge, which can be backwashable or disposable. The filter medium can be fabricated of, for example, cotton, polypropylene, nylon, polyethylene, polyester, or metal wire cloth.

Precoat filtration is a specific category of filtration. Precoat filter elements utilize an applied filter medium upon a porous support structure, termed a septum, to form a filter cake that is substantially isolated from the septum. The precoat can be a granular material, such as diatomaceous earth, perlite or cellulose fibers. The septum can be a woven fabric, a yarn-wound element, a laid non-woven fabric, or a relatively rigid perforated element. The precoat performs a filtration function and, thereby, protects the septum from fouling.

Typically, the size of the precoat media is larger than the size of the septum pores. The septum functions primarily as a support member and the precoat media perform most of the filtration that occurs. Periodically, the precoat is removed by, for example, backwashing and another precoat is applied.

In addition to performing the filtration function, some precoats may also interact chemically with contaminants in a process stream. For example, precoats including ion exchange resins are described in U.S. Pat. Nos. 3,250,702, 3,250,703, 3,250,704 and 3,250,705 to Levendusky. A mixture of powdered cation and anion exchange resin is applied as a precoat having a thickness of about one-sixteenth to about two inches on the outside of filter cartridge elements in a pressure shell. The described ion exchange resins have a particle size range of about 100 to 400 mesh. A pressure differential across the filter precoated with a mixture of powdered cation and anion exchange resin is relatively low when the resin is clean. The improvement in pressure differential is attributed to electrostatic forces which tend to clump cation and anion exchange particles, making the mixture more permeable to liquid flow. Other materials, such as cellulose fibers have been blended with the mixture of cation and anion resins in order to make a flocculating mixture that is still more clumping and permeable.

A method for removing impurities which employs a clumping filter precoat of oppositely charged particles of filter aid material is described in U.S. Pat. No. 4,177,142. The described filter aid materials include diatomaceous earth, cellulose fibers, charcoal, expanded perlite, asbestos fibers, ion exchange resins, and inorganic ion exchangers. The filter bed is portrayed as a mixture of oppositely charged particles of filter aid material, some having a normal surface charge and others having a chemically induced surface charge. The precoat of oppositely charged particles exhibits the clumping phenomenon.

Specialized apparatus have been developed to better exploit the advantages of mechanical and ion exchange precoats. For example, UK Patent Application GB 2 214 447A discloses a filter element for a precoat filter having a septum with longitudinal pleats. Circumferential bands constrain the septum during backwashing. A precoat having a minimum thickness of about 5 mm (0.2 inch) is described. This application states that precoat-type filters are used with ion exchange resin coatings in the treatment of feedwater and condensate for nuclear power generating systems, and that the filters may be backwashed to dislodge the precoat.

Various types of ultrafiltration and microfiltration apparatus have been used to separate metallic corrosion products from water streams, particularly boiler feedwater makeup and condensate return streams. Ultrafiltration is a pressure driven filtration on a molecular scale that includes passing a liquid stream through a sheet filter or, alternatively, a hollow fiber having a pore size of about 0.01 micron. Microfiltration is directed at relatively larger colloids and suspended particles, employing sheet filters, such as membranes, cartridge filters, or pleated filters having a pore size of about 0.1 microns. Alternatively, hollow fibers having a pore size of about 0.1 microns can be employed for microfiltration.

Hollow fibers differ from sheet filter membranes in that the hollow fibers are tubes having internal diameters in the range of about 0.1 to about 1 mm. Sheet filters are usually flat sheets or spiral-wound membranes fabricated from sheets. However, hollow fiber microfilters and sheet microfilters are often constructed from the same materials, such as cellulose acetate, polyamide, polysulfone, polyacrylonitrile, polyfuran, nylon and polyethylene.

The sheet filter can be woven, laid, cast, wound, extruded, or hot-melted and sprayed, as compared hollow fibers which are usually produced by casting. Sheet filters can process a relatively higher flow of liquid per unit area of septum, and are generally more economical to install and to operate, than the hollow fibers.

Japanese Kokai Patent Application No. HE 02-83020 describes filtration of recirculating water by hollow fibers which have been coated with powdered cation exchange resins for removal of ion impurities such as ferric and cupric ions. The application states that iron oxides can optionally be used as the coating. It is believed that the use of cation exchange resins described in the application is directed to the removal of ions, rather than particulates.

A filtration process using a hollow fiber filter is described in Japanese Kokai Patent Application Nos. SH 062-87023; SH 062-220200; and HE 011-80205. Water containing fine particles of iron oxide is reportedly passed through the hollow fiber filter to form a thin coating of iron oxide or iron hydroxide on the membrane. The thin coating is said to facilitate backwashing of contaminants which are subsequently collected on the filter. Reportedly, the layer of iron oxides shields the membrane from ferrous ions in the recirculating stream and, thereby, prevents the ferrous ions from precipitating on the membrane surface.

Hollow fiber filters and sheet filters are well suited for use in nuclear power generating stations because they can be effectively backwashed while producing a relatively small amount of backwash waste water for radioactive waste disposal. With the hollow fiber filters, it is possible to fabricate filter elements having relatively more surface area per unit volume than with the sheet filters. On the other hand, the sheet filters exhibit relatively higher flux rates, lower initial cost, and lower replacement cost.

Significant factors in selecting a filter for use in a nuclear power generating plant, are the frequency of backwashing in a particular service, and whether the filter exhibits a relatively low pressure differential after backwashing. Filters with relatively small pores tend to accumulate iron corrosion products on their external surfaces, perhaps because their pores are smaller in size than many contaminants. In comparison, filters having relatively larger pores, tend to allow some of the contaminants, such as iron corrosion products, to penetrate beneath their surfaces. Filters having relatively larger pores can be more difficult to backwash completely so as to regain an original condition pressure differential.

Another significant selection factor can be the amount of material which is sent to disposal as a result of backwashing or discarding filter. Waste disposal is usually expensive. In some applications, used precoat media and spent backwash water must be treated as radioactive or hazardous waste.

A need exists for an improved method of filtration which removes iron corrosion products from a water stream at relatively high efficiencies and which produces a filter cake that can be dislodged so that the filter is returned approximately to its original clean condition. The improved method should provide relatively low initial pressure differentials, and also longer service cycles that are not interrupted by plugging or precoat exhaustion. The improved method must not produce unnecessary waste for disposal.

SUMMARY OF THE INVENTION

The present invention provides a method for removing charged particles, such as corrosion products, clay, rust, ash and flocculated waste, from a water stream at relatively high efficiencies and low pressure differentials. In the method, a filtration surface of a sheet filter is conditioned by distributing a relatively small amount of ion exchange material on the filtration surface. The amount of the ion exchange material is significantly less than traditionally employed in precoat filtration, but is effective to adsorb a relatively fine portion of the corrosion products. Cation exchange material is used to remove positively charged particles, while anion exchange material is used to remove negatively charged particles. Subsequently, a liquid stream containing corrosion products is passed through the sheet filter at relatively large flow rates. High filtration efficiencies and favorably low pressure differentials result. The conditioned sheet filter exhibits relatively long run lengths during which an amount of the charged particles retained on the filter can exceed the weight of the ion exchange material applied.

In one aspect, the invention is a method for separating charged particles. The method comprises providing a sheet filter having a filtration medium in contact with a contaminated liquid stream. The filtration medium defines a filtration surface having pores of a median average size of about 0.1 to about 25 microns. Multiple filtration medium layers may be employed in series. The sheet filter is conditioned by applying on the filtration surface in a relatively small amount an ion exchange material capable of adsorbing charged particles. The ion exchange material is applied in an amount which averages about 0.0005 to about 0.075 pounds of the ion exchange material per square foot of the filtration surface.

Thereafter, the liquid stream is passed through the filter at a flow rate of more than about 0.2 gallons per minute per square foot of the filtration surface. Simultaneously, a pressure differential across the filter of less than about 20 pounds per square inch is observed, while greater than about 90 percent by weight of the charged particles in the liquid stream are retained on the filter. Surprisingly, the method can be continued until the weight of the retained charged particles on the filter is at least about equal to or greater than the weight of the applied ion exchange material.

In another aspect, the invention is a method for separating amorphous and other iron oxide corrosion products. In the method, a sheet filter having a filtration medium which defines a filtration surface is in contact with a water stream. The filtration surface has pores which communicate completely through the filtration medium having an average size in the range of about 0.1 to about 25 microns. The filter is conditioned by applying a particulate ion exchange resin having a weight average median size in the range of about 0.3 to about 200 microns. The ion exchange resin is capable of adsorbing the amorphous iron oxide and other corrosion products, and is present on the filtration surface in an average amount of about one-fifth to about 20 times the amount corresponding to a monolayer of said particles. Alternatively, the ion exchange resin is present in an amount of about 0.0005 to about 0.075 pounds per square foot of filtration surface. Thereafter, the water stream is passed through the filter at a flow rate of at least about 0.2 gallons per minute per square foot of the filtration surface, while a pressure drop of less than about 20 pounds per square inch results. Operation can continue in this manner at more than about 90 percent by weight separation efficiency of the corrosion products until the weight of the retained corrosion products is at least about equal to the weight of the applied ion exchange material.

In a third aspect, the invention is a method for separating metallic corrosion products having a relatively broad range of particle sizes. A relatively fine portion of the corrosion products are adsorbed on an adsorptive barrier composed of ion exchange material particles. The absorptive barrier is present in an amount corresponding to about one-fifth to about twenty times the amount corresponding to a monolayer of ion exchange material particles. Alternatively, the absorptive barrier is present in an amount of about 0.0005 to about 0.075 pounds per square foot of the filtration surface. The particles are distributed on an upstream filtration surface of a porous sheet filter in contact with a contaminated water stream. The fine portion of the corrosion products has a weight average mean size that is about one-tenth to about five times the median size of the sheet filter pores. A relatively coarse portion of the corrosion product is substantially mechanically retained adjacent the filtration surface. The coarse portion has a weight average size that is about five to about 50 times the median of the sheet filter pores. By absorbing the fine portion of the corrosion product, the adsorptive barrier prevents the corrosion products from penetrating and fouling the sheet filter. Simultaneously, extremely fine particles which might otherwise pass completely through the sheet filter can be adsorbed and retained. Consequently, the sheet filter can be operated until a total amount by weight of corrosion products is at least about equal to or greater than the initial weight of the ion exchange material particles.

In yet another aspect, the invention is a sheet filter for separating charged particles. The sheet filter comprises a sheet filter element having a filter medium which defines an upstream filtration surface. The surface is suitable for substantially filtering a liquid stream carrying charged particles having a relatively broad range of particle sizes. The surface defines pores having a median size of about 0.1 to about 25 microns. The sheet filter also comprises an adsorbent barrier composed of a particulate ion exchange material. The ion exchange material is capable of adsorbing the charged particles, and is distributed on the filtration surface an average amount of about 0.0005 to about 0.075 pounds of the ion exchange material per square foot of the filtration surface. Preferably, the sheet filter comprises two or more filtration medium layers with different amounts of ion exchange material distributed on each of the layers.

DETAILED DESCRIPTION OF THE PREFERRED ASPECTS

The invention provides a method for separating charged particles from a liquid stream. For example, the method can produce relatively pure water suitable for use as boiler feed water in steam generators, both fossil fueled and nuclear powered. The method can produce water suitable for use in the manufacture of high-grade electronic components, such as transistors and computer chips. The method can be used to remove corrosion products, clay, rust, ash or flocculated waste products from a wide variety of liquid streams. Alternatively, the method can separate radioactive particles from "low-level rad waste streams" which have been utilized to submerge radioactive fuel elements during storage. The method can provide all or part of a condensate water stream treatment, called "condensate polishing", and can serve as a primary means for removing corrosion products from a steam system.

The invention is believed to be useful for separating virtually any type of relatively small charged particles from suitable liquid stream. Herein, the term charged particles is intended to denote bits of solid matter or discrete droplets which, when dispersed in a given liquid, exhibit an electrostatic charge of sufficient magnitude to render the charged particles susceptible to adsorption by an ion exchange material. It is understood that the magnitude and polarity of the electrostatic charge depends on the composition of the liquid in which the charged particles are dispersed. Suitable liquids are those which do not quickly foul ion exchange material or carry a relatively large concentration of ions or charged particles other than those targeted for separation by the present method.

In a preferred aspect, which is illustrative but not limiting, the present invention is a method for separating corrosion products from a condensate water stream produced by a steam generation system. The steam system comprises a steam generation zone containing ferrous tubing and copper alloy tubing. The steam generation zone includes a boiler drum where a liquid phase is separated from a gaseous phase. Alternatively, the steam generation zone can be of a drumless design, especially for operation at supercritical pressures. The steam generation zone includes a nuclear reactor, a chemical reactor or some other source of heat, such as a hot process stream. Vaporous or supercritical steam is generated by the addition of heat. The steam leaves the steam generation zone and passes to a turbine where energy is extracted.

Steam which exits the turbine is cooled in a condenser to produce a condensate stream. Condensate pumps transport the condensate stream for reuse. The condensate stream is optionally stored temporarily before reuse, and is augmented with treated boiler feed water make up to replace water which has been lost by the steam system. The condensate stream, along with a relatively minor amount of makeup water, is subjected to a condensate polishing process in one or more steps.

A major objective of the condensate polishing process is the removal of metallic corrosion products from the condensate stream. In virtually all steam systems, water is in contact with tubes, vessel walls or valves made of ferrous or cuprous alloys. Some corrosion of the alloys is inevitable, even when the most meticulous operating procedures are employed.

If the products of such corrosion were allowed to remain within the steam system, serious damage would result. For example, iron containing corrosion products are known to form a deposit on the inside of tubes in high heat transfer areas, causing boiler tube failures. The acid cleaning procedure necessary to remove such deposits is expensive and time consuming. Similarly, iron containing corrosion products tend to accumulate on turbine blades, where they can cause significant losses in turbine efficiency, imbalance of the turbine blades, and eventual shutdown of the turbine.

The most common iron containing corrosion products are iron oxides. The iron oxides include $Fe_2O_3$, $Fe_3O_4$ and $FeOOH$. They may be present in either crystalline or amorphous form. The major crystalline types encountered in boiler feed water are $Fe_3O_4$, $\alpha$-$Fe_2O_3$, $\alpha$-$FeOOH$ and $\Gamma$-$FeOOH$. However, a substantial portion of the iron oxides are amorphous, and the amorphous material is especially effective at fouling equipment, including conventional filters. The iron-containing corrosion products generally dissociate when the water suspending them is acidified to a sufficiently low pH. However, many high pressure boilers are controlled at a pH of 6.5 or more, some at 8.5 pH or more, and the corrosion products are present primarily as solid particles. The iron compounds are often present as colloidal particles having a particle size of about 0.1 to about 5 microns.

Iron oxides, cobalt oxides and nickel oxides, for example, can be removed using the present invention, whether they be present in suspended, colloidal or dissolved form. It is intended that the method be utilized to remove transition metal oxides, generally, from condensate and other water streams. The transition metals are those elements found in Groups 3b, 4b, 5b, 6b, 7b, 8, 1b and 2b of the Periodic Table of Elements as depicted on the inside back cover of the 51st edition of the *Hand-* book of *Chemistry and Physics*, published by The Chemical Rubber Company.

The concentration of the contaminant is in the range of about 0.1 to about 1,000 parts per million, preferably about 1 to about 500 parts per billion, more preferably about 10 to about 30 parts per billion based on the weight of the aqueous stream. It is preferred that the concentration of the contaminant be reduced by at least about 90 percent by weight through the method of the present invention.

Herein, a filter is an assembly which includes a porous filter element which comprises one or more filtration medium layers defining a filtration surface, and also a filter housing which supports the filter element and directs a fluid stream flow. The filter may include prefiltration medium layers and post-filtration medium layers. The filter may include multiple filter elements in series or parallel flow arrangement. Valves, instrumentation and other equipment are optionally employed with the filter.

The method is carried out at or near a filtration surface of a sheet filter. As defined herein, a sheet filter is intended to be a filter having a porous filtration medium which is in the shape of a substantially planar layer or, alternatively, has been fashioned from a substantially planar layer. Sheet filters include leaf, tubular, pleated, flat membrane, and spiral would membrane filters. The filtration medium of the sheet filter can be an aggregate medium, such as a mat that has been laid, woven, hot melted and blown, or wound from a collection of relatively smaller structures such as fibers. Alternatively, the filtration medium of the sheet can be a substantially unitary medium, such as an extruded or cast membrane. The term sheet filter as employed herein is not intended to include filters which utilize hollow fibers as their filtration medium.

For example, the filter elements described in U.S. Pat. Nos. 4,269,707; 4,293,414; and U.K. Patent Application GB2214447A, which are hereby incorporated by reference in their entirety, are suitable for use in the method. Generally, suitable sheet filters have filtration surfaces which define pores that are about the same size or larger than the smallest significant portion of particulate metallic corrosion products that are targeted for separation. Preferably, the filtration surface of the sheet filter defines pores having a median average size of about 0.1 to about 25 microns, more preferably of about 0.3 micron to about 5 microns, and most preferably about 0.3 to about 1.0 microns.

Fibers which form the sheet filter can be natural or synthetic in origin, as for example, cotton or polyester fibers. Alternatively, the sheet filter can be a wire mesh screen fashioned from a metal such as stainless steel. It is preferred that the filter element be sufficiently strong so that the filter withstands backwashing without significant damage. The filter element may be provided with structural support to strengthen it. For example, external bands, foraminous tubes or additional fiber matrices can be incorporated to support the filtration surface during backwashing and normal operation.

The sheet filter is conditioned by applying an ion exchange material to the filtration surface of the filter medium in an amount sufficient to form an adsorptive barrier which adsorbs a relatively fine portion of charged particles, such as metallic corrosion products, ashes, clay, or flocs. The amount of the ion exchange material is insufficient to form a bed or a precoat layer capable of substantially mechanically retaining a relatively coarse portion of the metallic corrosion product. The relatively coarse portion substantially lodges on or near the porous filtration surface with gaps between the coarse particles which permit liquid carrying relatively finer particles to flow past the ion exchange material. In this manner, the ion exchange material is able to retain the finer particles, and so improve removal of the particles, as well as protect the filtration surface from plugging for a relatively long period of time without contributing significantly to a differential pressure observed across the filter element when the filter is in service.

Theoretically, an ideal conditioning of the sheet filter would consist of about one monolayer of ion exchange material uniformly distributed across the filtration surface. Herein, particles form a monolayer when they are present on a surface in the maximum amount possible consistent with having each particle simultaneously in contact with the surface and with the maximum number of neighboring particles. That is, the particles of the monolayer are close-packed on the surface but are not stacked one particle upon another.

It is convenient to define an amount by weight of particulate corresponding to the weight of one monolayer of similar particles. For example, an adsorptive barrier composed of about one-fifth of a monolayer contains a weight of ion exchange material particles that is one-fifth of the weight required to form a complete monolayer. Similarly, an amount corresponding to ten monolayers is ten times the amount required to form one monolayer. Of course, if particles are present on a surface in an amount of more than about one monolayer, some of the particles will necessarily be stacked one upon another.

The weight of the ion exchange material is calculated from its density, as determined in hydrated form, while substantially associated with the type of counter ions intended for use at the filtration surface. An optimum loading expressed as pounds of the ion exchange material on the filtration surface per square foot of the filtration surface, is preferably in the range of about 0.0005 to about 0.075 pounds per square foot, more preferably about 0.005 to about 0.05 pounds per square foot, based upon the absolute wet density of the ion exchange material. In terms of monolayers, a loading of about one-fifth to about twenty monolayers is preferred, of about one-half to about ten monolayers is especially preferred, and of about one monolayer is most preferred.

For an appropriate procedure for measuring wet absolute density, also called true density, see, R. Kunin, *Ion Exchange Resins,* 325 (1990). All of the ion exchange material retained on any part of the filter is summed to obtain the weight of distributed ion exchange material. However, only the area presented by the upstream surface of the filtration medium layer or, alternatively, the upstream surface of one of the filtration medium layers is included in the calculation of the loading. When the sheet filter comprises multiple porous layers, the layer which retains the greatest amount of the ion exchange material is the filtration medium layer that defines the upstream surface for calculation purposes. Other layers do not enter into the area calculation. If the filtration medium layer is pleated, the layer is disassembled and flattened but not stretched before measuring to calculate the upstream surface area.

The ion exchange material can be a cation exchange material, preferably a strongly acidic cation exchange material having an adsorptive resin base. Cation exchange materials are particularly effective at separating corrosion products which carry an electrically positive surface charge when suspended in a neutral pH to acidic aqueous stream as, for example, iron corrosion products. Suitable materials for the adsorbent resin base include sulfonated cross-linked polystyrene resins, acrylic resins and phenolic resins. The resins may be microreticular or macroreticular.

When the liquid is water, it is especially preferred that the cation exchange material be a dual morphology cation exchange resin. A resin is said to exhibit dual morphology when it can be reversibly converted from a dry, gelular morphology to a macroreticular, hydrated morphology by contact with water. A resin displaying gelular morphology predominantly contains gel-type pores which are of a molecular nature and are a part of the gel structure. Macroreticular morphology, also called macroporous morphology, contains a significant proportion of extra-gelular pores that are not a part of the gel structure. An example of a preferred dual morphology cation exchange resin is a resin which is commercially available under the trade name Diaion TM PK212L from the Mitsubishi Kasei Corporation of Tokyo, Japan. Dual morphology cation exchange resins are described in U.S. Pat. No. 5,192,446, which is assigned to the same assignee as the present invention and is hereby incorporated by reference in its entirety.

The cation exchange material is preferably in hydrogen, sodium, calcium, magnesium, morpholine or ammonia form, more preferably hydrogen, morpholine, or ammonia form. When an ion exchange resin is said to be in a specific ion form, the counter-ions held by the ion exchange material are substantially composed of the specific ion. For example, a cation exchange material in sodium form is attached substantially to sodium ions. Similarly, a cation exchange material in Fe(II) form is associated substantially with Fe(II) counter-ions. Preferably, the ion exchange material has an exchange capacity of about 0.1 to about 5 milliequivalents per cubic centimeter, as measured in the sodium form. More preferably, the ion exchange material has an exchange capacity of about 1.2 to about 2.5 milliequivalents per cubic centimeter.

Alternatively, the ion exchange material can be an anion exchange resin. Anion exchange materials are particularly effective for separating metallic corrosion products from water streams having a pH of about 8 or more. A preferred anion exchange resin for use in the present invention is commercially available under the trade name Diaion TM PK308 from the Mitsubishi Kasei Corporation. Dual morphology ion exchange resins have been described above. Dual morphology anion exchange resins are described in currently pending U.S. patent application Ser. No. 08/002,997, which application is assigned to the same assignee as the present invention and is hereby incorporated by reference in its entirety.

All of the adsorptive resin bases described above with regard to cation exchange material are suitable for use in the anion exchange material. The anion exchange material can be a strongly basic or a weakly basic anion exchange material, preferably strongly basic. It is preferred that the anion exchange material be present on the filtration surface in hydroxide, chloride or sulfate form, preferably hydroxide form. When the liquid stream is a water stream, the anion exchange material is hydrated.

The ion exchange material is a finely divided solid as, for example, spheroidal particles, angular granules or rod-like fibers. In each case, the largest dimension of the shape is taken to be the size. Herein, the weight average median size of a particulate sample is defined as the particle size for which the weight of larger particles and smaller particles present in the sample are equal.

Preferably, the ion exchange material has a weight average median size in the range of about 10 to about 200 microns, more preferably about 20 to about 100 microns. Ion exchange materials having a relatively larger size may be comminuted to a more suitable size and utilized in the invention. Ion exchange material having a size as described above provides a desirably large surface area per unit of volume that enhances adsorption of the corrosion products.

An especially preferred sheet filter element is pleated and is constituted by two or more porous layers, preferably three layers, which have been calendered together. At least one calendered layer preferably defines pores having a medium size of about 0.1 to about 25 microns, more preferably of about 3 to about 1.0 micron. The calendered layer or layers expected to retain a significant amount of an ion exchange material of known size distribution define a filtration surface or surfaces and are referred to as filtration medium layers. Additional porous layers having relatively larger pores are preferably located upstream and downstream of the filtration medium layers to provide postfiltration, drainage, or mechanical support during backwashing and normal operation. An especially preferred sheet filter element is commercially available from The Graver Company under the trade name Aegis TM AFA filter.

The ion exchange material is preferably applied to the filtration surface or surfaces, thereby conditioning the filter, by directing a slurry that contains the ion exchange material into the filter. Preferably, the slurry is circulated through the filter in the same direction in which a water stream flows during normal operation. When multiple porous layers, including filtration medium layers, are employed in series, the ion exchange material comes to rest on and within the layers in varying amounts. The amount and size of ion exchange material on each layer depends primarily on the size distribution of pores among the layers. The ion exchange material may be applied at any time, but is preferably applied before the filter is placed into service. Alternatively, the ion exchange material is applied by "body feeding" the ion exchange material upstream of the filter into a liquid process stream while the filter is in service during normal operation. The body feeding of the ion exchange material can be continuous, intermittent or single-shot fashion.

The invention may be employed with a mixture of an ion exchange material having a surface charge and another material having an opposite surface charge, such as an oppositely charged ion exchange material or an oppositely charged filter aid material. The opposite charge can be imparted to the filter aid material by chemical treatment. In that case, a widely-known phenomena called "clumping" produces a volume increase which previously has been associated with a decrease in hydraulic pressure differential through relatively thick layers, such as filter precoat layers. Alternatively, the ion exchange material of the present invention may be employed with filter aid materials having like or neutral surface charges.

Preferably, conditioning the filter with materials having like surface charges, such as one type of ion exchange material, either an anion exchange material or a cation exchange material, provides an advantage in many applications. First, conditioning the filter with the relatively small amounts of ion exchange material described above produces a comparatively small pressure differential across the filter during initial operation. Also, the adsorptive function tends to protect the pores of the filtration surface from fouling during subsequent operation. As a result, there is little incentive to further reduce the pressure drop across the ion exchange material by resorting, for example, to clumping produced by opposite surface charges.

Secondly, there are many applications in which it is important to minimize the amount of material applied to the filtration surface. For example, when the present invention is utilized to polish the condensate of a nuclear power plant, metallic corrosion products retained on the filter can be radioactive and require special handling and disposal techniques. The ion exchange material applied on the filtration surface necessarily becomes mixed with such radioactive corrosion products and contributes to the mass and volume of material requiring special handling and disposal. In this regard, it is noted that the use of clumping filtering aids tends to increase the disposal volume of spent filter aid material.

Thirdly, it has been observed that applying particulate material having a single, common surface charge tends to produce a more uniform application as compared to clumping particulate material. For example, certain pleated filters which have traditionally been regarded as difficult to precoat uniformly with clumping filter aids can be conditioned successfully with a cation exchange resin.

Consequently, in application wherein minimizing disposal mass and volume is important, it is preferred that the sheet filter be conditioned by applying ion exchange material which includes a cation exchange resin but includes essentially no anion exchange resin. Alternatively, it is preferred in such applications that the ion exchange material includes an anion exchange resin, but includes essentially no cation exchange resin. For example, a boiling water reactor nuclear power plant generates a condensate stream of about 7.0 pH that carries radioactive corrosion products. Such a stream is preferably treated with a filter conditioned with a cation exchange resin, and essentially no anion exchange resin. As another example, an anion exchange resin with essentially no cation exchange resin, would be appropriate for treating an iron- and zinc-containing waste water stream having a pH in the range of about 10 to about 11.

Relatively low initial pressure differential and comparative freedom from fouling permit the sheet filter of the present invention to be operated at favorably high flux rates and retention efficiencies and for longer service runs. During the longer runs, greater amounts of corrosion products can be retained on the filter, as compared to conventional filters. Desirably high flow rates of more than about 0.2, preferably more than about 0.4 gallons per minute per square foot of the filtration surface can be maintained at commercially practical pressure differentials across the filter of less than about 20, preferably less than about 30, and most preferably less than about 12 psi. During this operation, greater than about 90 percent, preferably greater than about 95 percent, by weight of the corrosion products in the water streams are retained on the filter until the weight of retained corrosion products is at least about equal to or greater than, preferably at least about three times, the weight of the applied ion exchange material. More preferably, filter operation is continued in this manner until the weight of retained corrosion product is at least about five times the weight of the applied ion exchange material.

A filter run is usually terminated when the differential pressure across the filter exceeds a predetermined maximum or, alternatively, when the ion exchange material becomes substantially saturated with adsorbed corrosion products. In water treating service, dual morphology ion exchange materials described above are believed to adsorb relatively more corrosion products per weight of ion exchange material before approaching saturation, as compared to conventional ion exchange materials. Herein, saturation is understood to be achieved when an ion exchange material has adsorbed about 90 percent by weight or more of the maximum theoretical amount which the material can adsorb.

After the service run, the conditioned sheet filter element is, optionally, relegated to disposal. Preferably, the filter element is cleaned, reconditioned, and returned to service. More preferably, the filter is cleaned by backwashing using techniques that are well known in the water treatment industry.

Although the success of the invention does not depend upon any theory, it is hypothesized that the adsorptive barrier serves to protect the filtration surface from fouling by the relatively fine portion of the corrosion products. The relatively small amount of ion exchange material employed provides comparatively little residence time for interaction with the corrosion products. During the brief residence time, fine corrosion products are thought to be retained on the surface of the resinous base of the ion exchange material.

It is further hypothesized that the counter-ions and fixed ions of the ion exchange material induce an advantageous electrical surface charge on the ion exchange material particles which assists the charged particles in approaching the surface of the resinous base. Therefore, it is preferred that the adsorptive barrier be composed of ion exchange material particles having exchange sites bound to a base composed of a resinous material. For purifying water streams, it is especially preferred that the ion exchange material be a dual morphology exchange material, as described above, which tends to adsorb more charged particles before becoming saturated, as compared to conventional ion exchange materials.

The adsorptive barrier is positioned substantially on the filtration surface. The relatively coarse portion of the charged particles is, in large part, is retained at or near the filtration surface. The adsorption of the fine portion substantially prevents the relatively fine charged particles from penetrating, and thereby fouling, the filter medium for a relatively longer time as compared to conventional filtration techniques. The adsorption of the fine portion also improves removal efficiency.

Figure 1:
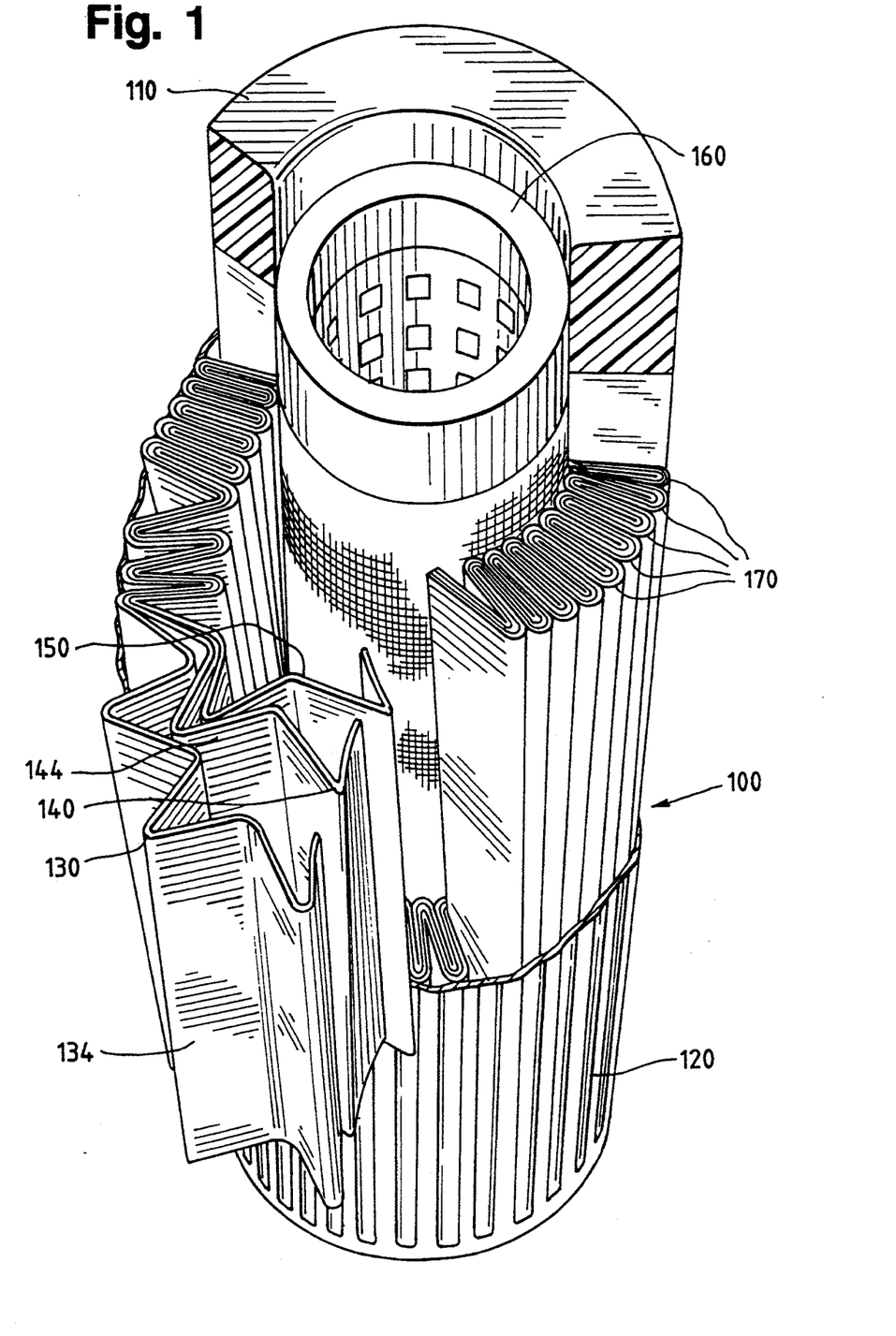
FIG. 1 is a cutaway perspective view of a conditioned sheet filter element of the present invention.

In another aspect, the invention is a sheet filter for removing charged particles. When such particles are present in a liquid stream, they often exhibit a relatively broad range of particle sizes. Referring now to FIG. 1, an especially preferred sheet filter of the present invention comprises a sheet filter element 100 having a porous inner filtration medium layer 140 which defines an upstream filtration surface 144 suitable for mechanically filtering particulate metallic corrosion products from a water stream. The pores of the inner filtration medium layer 140 preferably have a medium size of 0.1 to about 20 microns, more preferably, of about 0.3 to about 1 micron. The filter also comprises a conventional housing, not shown in FIG. 1, which substantially surrounds the filter element 100.

The sheet filter element 100 includes plastic end seals 110 and an exterior supporting structure 120 that defines pores larger than the particles that the inner filtration surface 144 is designed to retain and, preferably, larger than a particulate ion exchange material, described above. Beneath the exterior supporting structure is a porous outer filtration medium layer 130. The pores of the outer filtration medium layer 130 are smaller than the pores of the exterior supporting structure 120, but are larger than most of the pores of the inner filtration medium layer 140. Preferably, the pores of the outer prefiltration medium layer 130 are about 10 to about 100 microns, more preferably, about 30 to about 50 microns in size. The filter element 100 also includes drainage layer 150 and an interior perforated central core 160 which are located downstream of the inner filtration medium layer 140. The interior perforated central core 160 has pores similar in size to or larger than the pores of the outer filtration medium layer 130.

The inner filter medium layer 140 is preferably made of a polymeric material. Although any polymeric material that can provide a filter medium with uniform porosity is acceptable, the preferred filter medium material is polyester. The inner filtration medium layer 140 is arranged in pleats 170 like an accordion and is wrapped cylindrically around the drainage layer 150 and the center core 160. The inner filtration medium layer 140 is calendered to the outer filtration medium layer 130 and to the drainage layer 150. Preferably, the ends of the inner filtration medium layer 140 are, for example, thermally bonded, epoxied or ultrasonically welded together and attached to the end seals 110.

The depth and length of the pleats 170 determine the filter surface area per unit length of the sheet filter element 100. Preferably, the site of the pleats 170 is such that there are at least three square feet of the filtration surface 144 per 10-inch length of the filter element 100. For optimum filter performance there is preferably less than seven square feet of the filtration surface 144 per 10-inch length of the filter element 100.

The sheet filter element must be able to operate under a variety of process and backwash conditions because the apparatus in which they are contained are intended to be suitable for a variety of processes. The pressure of the process stream passing through the filter can vary from 50 pounds per square inch (psi) to 600 psi. The temperature can vary from about 32° to 150° F. (0° to 65° C.).

The sheet filter element must also be able to endure a variety of backwashing conditions. As mentioned previously, the filter element is backwashed to remove the particles that have accumulated on the element when the pressure drop of the process stream through the filter increases to about 5 to about 20 psi. Although the filter element is preferably backwashed using a combination of air and water, the filter element can be backwashed using only water if air is unavailable.

Backwashing conditions vary depending upon the process in which the apparatus is being used. If the apparatus of the present invention is being used to remove impurities from boiler feedwater in a pressurized water reactor nuclear plant or, alternatively, in a fossil fuel (oil or coal) fired power steam plant, the flow rate of air through the apparatus during backwash is about 1 to about 1.5 standard cubic feet per minute (scfm) per square foot of filter element surface area. The flow rate of water through the apparatus during backwash is about 1 to about 1.5 gallons per minute (gpm) per square foot of filter element surface area. Preferably, the apparatus is backwashed with the water and air simultaneously for in the range of about 2 to about 12 minutes to remove the particulate products from the filter elements therein. All backwashing flow rates are based upon the surface area of the cylinder defined by the exterior of the filter element.

If the apparatus of the present invention is used to remove particles from boiler feedwater in a boiling water reactor nuclear plant, the flow rate of air during backwash is preferably about 1.5 scfm per square foot of filter area. The flow rate of water is preferably about 0.5 to about 1 gpm per square foot of filter surface area. This backwash cycle preferably lasts about 14 minutes. Again, the filter is backwashed with air and water simultaneously.

The filter element can also be backwashed using an Air Surge ™ backwash cycle. Water flows through the apparatus continuously during the air surge backwash cycle, and surges of high pressure air are provided periodically. The water flows at a rate of about 0.25 per square foot of filter element surface area. The air flow rate during the air surge is about 12 scfm per square foot of filter element surface area. The air is at a pressure of about 50 psi to about 100 psi. The air surge is provided about eight times during the 14-minute backwash cycle, each surge lasting approximately two seconds.

An adsorbent barrier (not shown) composed of a particulate ion exchange material, as described above, is distributed on the inner filtration surface 144 and on the outer filtration surface 134 in an amount of about 0.0005 to about 0.075 pounds, more preferably about 0.005 to about 0.05 pounds, of the ion exchange material per square foot of the filtration surface 134. All of the ion exchange material retained on any part of the filter contributes to the weight of ion exchange material for calculation purposes. However, in calculating the amount, only the area of the upstream surface of one of the filtration medium layers (130 or 140) is considered. For example, only the upstream surface area of the outer filtration medium layer 130 is considered when more of the ion exchange material accumulates on the outer filtration medium layer 130 than the inner filtration medium layer 140. The adsorbent barrier is intended to substantially separate a relatively fine portion of the corrosion products before the fine portion can penetrate and, thereby, foul the filtration medium layer 140.

The following examples are presented to further communicate the invention. The examples are not intended to limit the invention in any way.

EXAMPLE 1

A pilot plant test was conducted which demonstrated the performance of a commercial scale sheet filter element under plant operating conditions at a boiling water reactor nuclear power generating station. An influent condensate water stream for the pilot plant test unit was taken from the discharge of primary condensate pumps of the generating station. In this example, as a control experiment, a filter suitable for use in the present invention was employed without ion exchange material conditioning.

Iron particulate levels in the influent stream were in the range of 20 to 25 parts per billion by weight, which was significantly greater than typical feedwater iron particulate levels which ranged about 5 to about 10 pph. Accordingly, a large part of the particulate was composed of iron corrosion products, most likely originating in carbon steel extraction steam and heater drain piping. The generating station was equipped with a deep-bed bead resin condensate polishing system which removed about 70 percent of particulates which entered the deep-bed system. The generating station had recently adopted hydrogen water chemistry and was injecting depleted zinc.

Figure 2:
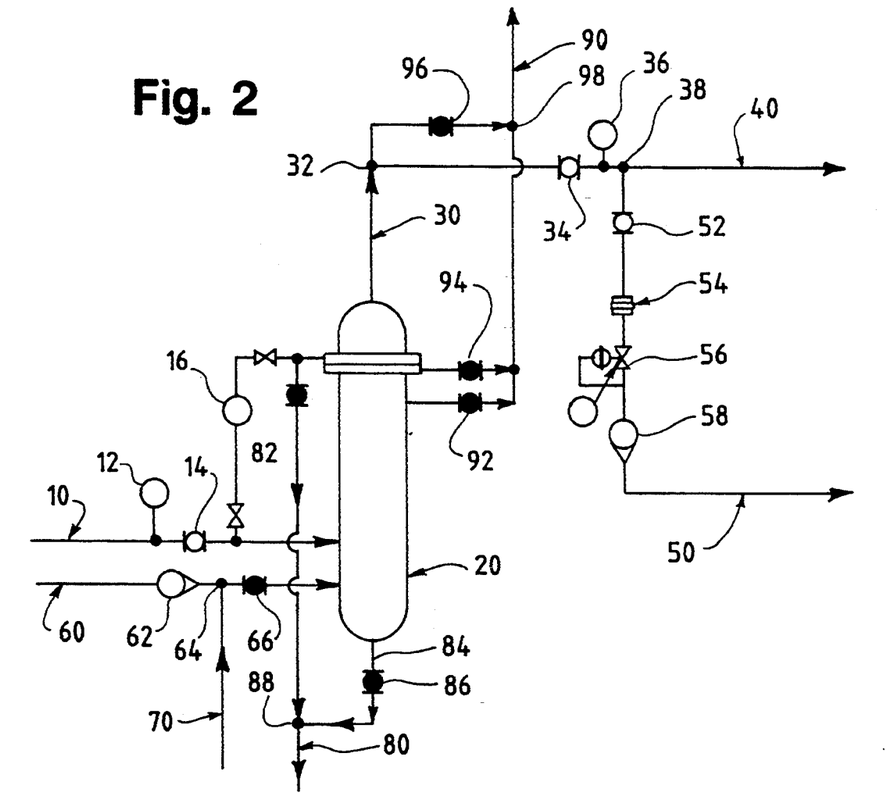
FIG. 2 is a schematic flow diagram of a filter test apparatus used to demonstrate a method for removing charged particles from a water stream.

Referring now to FIG. 2, the influent stream was transported by a conduit 10, which was equipped with a flow indicator 12 and block valve 14, to a filter housing 20. During the first cycle, the influent stream was controlled at a flow rate of about 9.0 gallons per minute (gpm). The filter housing 20 contained a pleated filter element suitable for use in the present method, such as the filter element 100 shown in FIG. 1. The sheet filter element utilized is commercially available from The Graver Company under the trade name Aegis TM AFA filter. However, the sheet filter element in the housing 20 had not been conditioned by applying an ion exchange material and, consequently, represented a previously known separation method.

The filter element was installed in the housing 20 so that the influent stream from the conduit 10 entered the filter element from the outside, traveled radially through the filter element, and exited longitudinally from one end of the filter element during normal operation. A differential pressure indicator 16 was provided to measure the differential pressure across the filter element.

A purified condensate stream traveled out of the housing 20 by means of a conduit 30 that was equipped with a vent junction 32, a shutoff valve 34 and a flow indicator 36. The conduit 30 terminated in a junction 38 which was in fluid communication with an effluent conduit 40 and a sample line 50. The effluent conduit 40 carried the bulk of the purified condensate stream to a bead resin condensate polishing section of the generating station.

The sample line 50 was equipped with a shutoff valve 52, a sampling filter 54, a pressure control valve 56 and a flow indicator 58. A sample stream taken from the purified condensate stream at the junction 38 passed through the sampling filter 54 and then passed to disposal.

The sampling filter 54 contained 0.45 micron filter paper. The filter paper was weighed before and after sampling, and the concentration of particulate corrosion products which had passed through the filter were calculated. A similar arrangement was employed upstream of the filter housing to determine the concentration of particulate corrosion products in the influent stream. By difference, a separation efficiency was calculated.

The sheet filter element was installed in brand new condition and the first test cycle was initiated by introducing the influent stream to the filter housing 20. The influent stream temperature was approximately 100° over the first cycle. A differential pressure, as indicated by the differential pressure indicator 16, was observed to increase over a period of time to about 12 psi. At that time, a backwashing procedure was performed. As is customary in testing backwashable filters, data from the first cycle of the filter element was disregarded, since the first cycle is not normally indicative of long term performance.

The sheet filter element was backwashed by opening a valve 64 and passing about 1.5 standard cubic feet of air per square foot of filter surface area through an air conduit 60. The air conduit 60 is equipped with a flow indicator 62. Simultaneously, about 0.7 gallons per minute of backwash water per square foot of filter surface was introduced into the conduit 60 at junction 64. Accordingly, a mixture of air and backwash water traveled longitudinally along the center of the filter element and then passed radially outwardly through the filter media, thereby dislodging particulate which had come to rest in or on the filter media.

The backwashing liquid was removed from the filter housing 20 by a conduit 80 equipped with a valve 82 and a junction 88. The junction 88 intermittently communicated with the filter housing 20 through a drain line 84 and a valve 86.

Spent air from the backwashing was removed from the filter housing 20 through a spent air conduit 90 via a junction 98. The conduit 90 communicated intermittently with the filter housing 20 through three vent valves, 92, 94 and 96.

To begin a second cycle, the same filter element was again commissioned with the influent stream passing radially inwardly through the filter element at about 8.9 to about 9.0 gpm. No ion exchange material or conditioning was applied to the filter for the second cycle. At intervals, the pressure differential indicator 16 was utilized to determine the pressure differential across the filter element. Pressure drop data for the second cycle is represented as a function of days in service by triangles in FIG. 3, below.

When the second cycle pressure had increased to about 12 pounds per square inch, the second cycle was terminated by backwashing the filter. The backwashing procedure was the same as was utilized at the end of the first cycle. Removal efficiency for iron averaged about 90 percent.

EXAMPLE 2

After the second backwashing, the sheet filter element described above was prepared for a third cycle of operation by conditioning the filter element. Before the third cycle was initiated, the filter element was conditioned by passing an aqueous slurry containing 45 grams of a finely divided cation exchange resin through the filter element in the direction of normal flow. The cation exchange resin is commercially available from Mitsubishi Kasei Corporation of Tokyo, Japan under the trade name of Diaion TM PK212L. The cation exchange material had been ground to a median weight average particle size of about 60 microns, with about 10 percent by weight less than 20 microns. The particle size and the mass of cation exchange resin utilized corresponded to about 1 monolayer for the filtration surface of the filter being tested.

Subsequently, the influent stream was passed radially inwardly through the filter element at a flow of about 8.9 to about 9.0 gallons per minute. Pressure drop data for the third cycle is represented by asterisks in FIG. 3, below.

Figure 3:
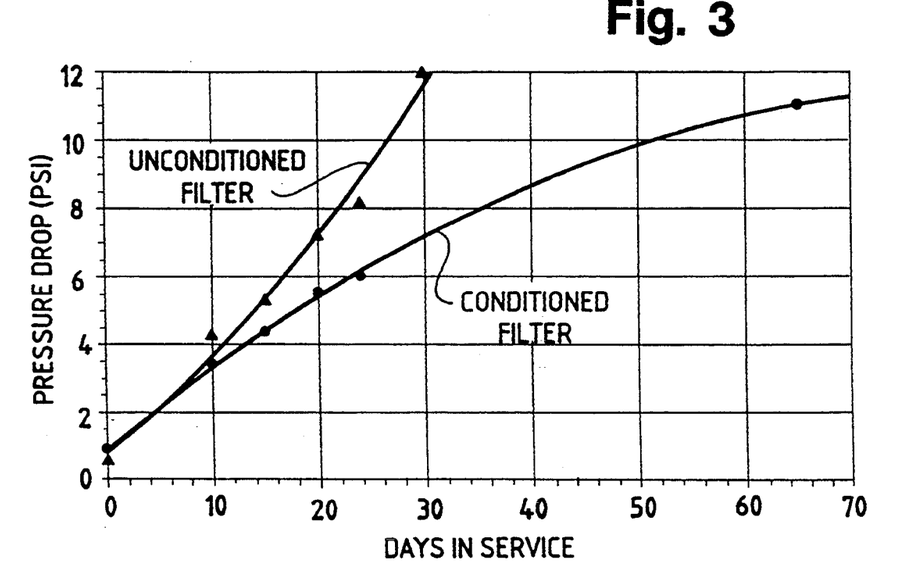
FIG. 3 presents a graph showing pressure differentials across a conditioned sheet filter and a conventional filter as functions of test days in service.

Inspection of the data in FIG. 3 reveals that the conditioned filter exhibited significantly less pressure drop than did the unconditioned filter under directly comparable service conditions. The pressure drop of the unconditioned filter was initially 0.8 pounds per square inch (psi) and increased approximately linearly to 11.9 psi in 30 service days. In contrast, the conditioned filter came on-stream at 0.6 psi pressure drop and exhibited only 11.5 psi pressure drop after 65 service days. Significantly, this improvement in pressure drop was observed on the third service cycle, after the filter element had experienced two service and backwash cycles. The data in FIG. 3 indicates that a relatively small application of ion exchange material produced an unexpectedly low pressure drop and a longer period of useful service as compared to conventional operation. In addition, improved iron removal was noted. The iron removal efficiency was on the order of 99 percent.

Although aspects of the present invention have been described for the purpose of clarity, it is not intended that the invention be limited to the described aspects. The scope of the invention is intended to be as broad as the claims will allow. Further, although certain hypotheses have been advanced as possible explanations for the surprising effectiveness of the present invention, the invention does not stand or fall with the theories. The invention, when practiced as described, represents a significant advance in the technology of separating metallic corrosion products from water streams.

What is claimed is:

1. A method for separating fine and coarse charged particles from a liquid stream, which comprises:
   providing a sheet filter having a filtration medium which defines a filtration surface having pores of a median average size of about 0.1 to about 25 microns in contact with a liquid stream;
   conditioning the sheet filter by applying an ion exchange material, capable of adsorbing charged particles, on the filtration surface in an average amount of about 0.0005 to about 0.075 pounds of the ion exchange material per square foot of the filtration surface, based upon the absolute wet density of the ion exchange material;
   passing the liquid stream through the sheet filter at a flow rate of more than about 0.2 gallons per minute per square foot of the filtration surface at a pressure differential across the filter of less than about 20 pounds per square inch so as to separate a substantial proportion of the fine charged particles from the liquid stream on the ion exchange material and separate a substantial portion of the coarse charged particles on the filtration medium.

2. The method of claim 1 wherein said ion exchange material is in the form of particles having a weight average median size in the range of about 0.1 to about 200 microns.

3. The method of claim 1 wherein said filter medium is pleated and is formed by an inner filtration medium layer calendered together with an outer filtration medium layer, each of the calendered layers defining pores having a size of at least about 0.1 micron.

4. The method of claim 1 wherein said ion exchange material is applied in an amount of about 0.005 to about 0.05 pounds per square foot of the filtration surface.

5. The method of claim 1 which further comprises backwashing the filter to substantially dislodge the applied ion resin material and the retained particles.

6. The method of claim 1 wherein said charged particles are composed substantially of iron oxides.

7. The method of claim 1 wherein said conditioning of the sheet filter includes body feeding a substantial portion of the ion exchange material while said liquid stream passes through the sheet filter.

8. The method of claim 1 which further comprises retaining on the filter greater than about 90 percent by weight of the charged particles in the liquid stream until the weight of the retained charged particles is at least about equal to the weight of the applied ion exchange material.

9. The method of claim 8 wherein said cation exchange material is strongly acidic.

10. The method of claim 8 wherein said cation exchange material is weakly acidic.

11. The method of claim 8 wherein said cation exchange material is in an ionic form selected from the group consisting of hydrogen form, morpholine form and ammonia form.

12. The method of claim 1 wherein said ion exchange material includes a cation exchange material, but includes essentially no anion exchange material.

13. The method of claim 12 wherein said ion exchange material includes a dual morphology cation material.

14. The method of claim 1 wherein said ion exchange material includes an anion exchange material, but includes essentially no cation exchange material.

15. The method of claim 14 wherein said anion exchange material is strongly basic.

16. The method of claim 14 wherein said anion exchange material is weakly basic.

17. The method of claim 14 wherein said anion exchange material is in hydroxide form.

18. The method of claim 14 wherein said ion exchange material includes a dual morphology anion exchange material.

19. A method for separating fine and coarse iron oxide corrosion products from a water stream, which comprises:
   providing a sheet filter having a filtration medium which defines a filtration surface having pores of an average size in the range of about 0.1 to about 25 microns in contact with a water stream;
   conditioning the sheet filter by applying an ion exchange material in the form of particles having a weight average median size in the range of about 0.1 to about 200 microns, capable of adsorbing iron oxide corrosion products, on the filtration surface in an average amount of about one-fifty to twenty times the amount corresponding to a monolayer of said particles;
   passing the water stream through the sheet filter at a flow rate of at least about 0.2 gallons per minute per square foot of the filtration surface at a pressure drop across the filter of less than about 20 pounds per square inch while substantially retaining said corrosion products on the sheet filter so as to separate a substantial proportion of said fine corrosion products from the water stream on the ion exchange material and separate a substantial portion of the coarse corrosion products on the filtration medium.

20. The method of claim 19 wherein said conditioning includes applying the ion exchange material in an amount of about 0.0005 to about 0.075 pounds per square foot of the filtration surface, based upon the absolute wet density of the ion exchange material.

21. The method of claim 19 wherein said passing of the water stream is accomplished while retaining on the sheet filter more than about 90 percent by weight of the corrosion products in the water stream until the weight of retained corrosion products on the sheet filter is at least equal to the weight of the applied ion exchange material.

* * * * *